United States Patent Office 2,710,858
Patented June 14, 1955

2,710,858

MAKING FERRILACTIN

Richard J. Block, Scarsdale, N. Y., and Diana Bolling, Greenwich, Conn., assignors to The Borden Company, a corporation of New Jersey No Drawing. Application May 2, 1952, Serial No. 285,802

3 Claims. (Cl. 260—115)

This invention relates to methods of obtaining products of value from whey and to certain new types of products obtained by such methods.

In accordance with the present invention, whey (skimmed milk from which the casein has been removed) is treated with a small amount of a soluble ferric salt in sufficient quantity to precipitate protein present. The amount of the iron salt will depend upon the amount of ionic material present. For example, if deionized whey is used, only about ⅓ to ¼ the amount of iron salt will be required that is used with ordinary whey. While any soluble ferric salt may be employed such for example as the bromide or sulphate, since the products which we are proposing to make are intended to be available for use for human consumption, we prefer to use ferric chloride, and accordingly that material is described in this specification. If for any reason other ferric salts are desired, they may be employed instead of the chloride.

Using ferric chloride, the amount employed will ordinarily be sufficient to form a solution equivalent to a 0.02 to 0.06 molar solution based on the volume of liquid present. When the ferric chloride is added to the whey, the pH drops and the extent of this drop will depend upon the amount of ferric chloride employed. This amount should be enough to bring the pH down to 4.5 and preferably to 4.3. At the high end of the iron range the pH will drop to about 2. In such case after all of the iron salt is added the pH is gradually raised to between 3.5 and 4.5 and preferably to between 4 and 4.3 using an alkali. In such case the pH preferably should not be raised beyond the desired point and then again be lowered.

At the pH of about 4.3 a precipitate comes down varying from a pale brown if the iron content is low, to a reddish brown when the iron content is toward the maximum. The mixture preferably is allowed to stand for a time to be sure that the reaction is complete and then may be centrifuged. On test it will be found that the filtrate gives substantially no test for protein either with trichloracetic acid or on heating, but this filtrate gives a strong test for carbohydrate. The use of this process gives a very easy method of preparing lactose which can be crystallized from the filtrate and avoids the necessity of employing the usual processes of purification and filtration with bone-black and the like. The liquid remaining after the lactose is crystallized out is a valuable source of whey factors for poultry and farm animal feeding.

The precipitate produced with the ferric chloride should be washed to remove carbohydrates and at least the last of the wash waters should be at a pH of about 4.3. The washed precipitate can be purified by dissolving with an alkali such as ammonium hydroxide or sodium or potassium hydroxide. The material is completely soluble at a pH of 9 and apparently is soluble at somewhat lower pH's. This solution may be dried directly or may be re-precipitated by the use of cold ethyl alcohol. The precipitate may be washed with cold ethyl alcohol and the addition of some ether may be of assistance in causing the precipitate to come down.

The precipitate thus produced is a new compound to which we have given the name "ferrilactin." This compound contains protein material with which is combined from about 10% to about 20% of iron depending upon the amount of iron salt used for obtaining the precipitate. We have found that this combination is in the form of what is known as a chelated complex, that is, a non-ionizable salt. It is characterized by the fact that it is readily soluble at ordinary neutrality, that is, at pH's down to about 6. In fact, its behavior in this regard is rather similar to the product known as ferritin, which is a natural combination of iron and protein produced in the body and which gives up its iron in bone marrow to make hemoglobin.

It is readily digested by trypsin (intestinal juice which functions in an alkaline medium) and it is an interesting fact that while this material is insoluble in solutions at a pH slightly below 6, it is again soluble in acid solutions with a pH below 3.5. This means that the material will be soluble in the stomach and we have found that it is readily digested by pepsin (gastric juice). After the material is digested with the proteolytic enzymes, the iron becomes completely ionized and is readily assimilated, that is, when the product is used as a food.

If desired the precipitate of ferrilactin obtained as above may be treated to remove the iron and produce a pure form of protein which we call "lactin." To produce this material the whey is treated with a soluble ferric salt as described above and the lactose is washed out as previously described. The precipitate of ferrilactin which is in the form of a sludge is then treated with $SO_2$ gas or with salts of $SO_2$ such as $NaHSO_3$, $Na_2SO_3$ $(NH_4)_2SO_3$ or $KHSO_3$. The purpose of this treatment is to reduce ferric iron to ferrous iron in order to split the iron-protein complex. This renders the iron soluble. Using the $SO_2$ gas as an example, when the suspension becomes acid, say at a pH of about 2, the precipitate dissolves and the treatment is then continued for approximately an hour afterward to insure complete iron removal. The solution should be allowed to stand for several hours during which time the pH may drop to about 1.5. This solution is now adjusted to a pH of 2 with an alkali such as ammonia, sodium hydroxide or the like. A large precipitate comes down. This precipitate can be washed with water which should be at a pH of about 4 to 4.3. Purification can be accomplished by alternately dissolving the precipitate in alkali at a pH of 8 or 9 and again passing in $SO_2$ to form a solution and re-precipitating. This may be continued until the filtrate is free from iron which has been removed as ferrous sulfite. The lactin thus purified of iron is purified of $SO_2$ and $FeSO_3$ in any desired manner; for example, sulphuric acid can be added to bring the pH down to about 1 and then the material can be re-precipitated at a pH of about 2. The latter procedure is also effective for removing the last traces of iron since $FeSO_4$ is much more soluble than $FeSO_3$.

Despite the fact that this protein body is one precipitated from whey, it differs from lactalbumin in that it is not coagulable with heat (boiling at about 100° C.) at a pH of 6, whereas lactalbumin readily coagulates under these conditions.

The lactin has a nitrogen content of 14 to 15% and is characterized by the fact that it is substantially pure protein material, that is, it contains no non-amino acid material.

The invention may be readily understood from the following illustrative examples:

*Example 1*

2.5 liters of unpasteurized skimmed milk were treated with acetic acid at a pH of 4.55 to remove the casein.

The whey amounted to 1750 ml. To this whey was added, with stirring, 25.2 gm. $FeCl_3 \cdot 6H_2O$ in 100 ml. of water. (The concentration of the resulting solution was approximately 0.053 molar ferric chloride.) The pH was adjusted to 4.05 with 25 ml. of 5 normal NaOH. After standing at room temperature for ½-hour the material was centrifuged. The filtrate gave no precipitate with trichloracetic acid or when heated to 100° C. The precipitate of ferrilactin was washed three times with 500 ml. of water and on the last wash care was taken that the pH of the water was 4.3. The filtrate and washings were saved and their treatment is described in Example No. II.

The washed precipitate of ferrilactin was brought into solution by the addition of about 10 ml. of concentrated $NH_4OH$. The precipitate was completely soluble at a pH of 9 and appeared to start going into solution at a somewhat lower pH. The solution had a dark reddish color and amounted to 375 ml. It was cooled to 0° C. and 3050 ml. of cold ($-5°$ C.) ethyl alcohol were added. The precipitate was allowed to remain overnight at a temperature of $-4°$ C.

The next day the mass was centrifuged and the precipitate washed with cold 95% ethyl alcohol and ether. It was found that when too much alcohol is used, some of the precipitate will not centrifuge but comes down on the addition of ether without change in structure. The ferrilactin was dried overnight and gave a yield of 31 gm. containing about 8% nitrogen, about 14% moisture and about 20% iron. This was equivalent to about 16 gm. of protein.

On test it was found that the precipitated ferrilactin goes into solution completely in cold water at a pH of between about 7.4 and 7.9. After being put into solution the pH may be lowered to about 6 without the protein coming out of solution. It precipitates completely at a pH of 4 and redissolves again at a pH of 2.5 and stays in solution if the pH is raised up to approximately 3.5. It can also be dissolved at a pH of between 7 and 8. When tested with potassium ferri- or ferrocyanide at approximate neutrality the test was substantially negative, indicating the material contained no free ferrous or ferric ions. The solution was negative to a test for carbohydrate and showed a slightly positive reaction to the Nessler test. The material was precipitated by trichloracetic acid but was not coagulated at the boiling point over a pH range of from 6 to 7.4. No ionizable iron was shown by the fluoride test. The material had a bland taste and its appearance was a reddish brown powder.

To test its digestibility it was solubilized by pepsin HCl at a pH of 1.5 and by trypsin with a sodium borate buffer at a pH of 7.95. The trichloracetic acid test then showed only a trace of protein precipitate from either of these solutions. The addition of NaF removed the yellowish color showing that the ferric iron had been liberated from the protein by digestion and was ionized. The iron present appeared to be all in the ferric state.

*Example II*

The filtrate and the washings obtained after the first precipitate of ferrilactin in Example I were concentrated to a thing syrup from which lactose was readily crystallized without any other treatment. The yield of lactose was 73% based on the quantity of lactose in the original milk and 90% based on the lactose in the whey. This material showed satisfactory purity and color without the necessity of using special filtering or decolorizing steps.

*Example III*

Casein was removed from 2 liters of skimmed milk as in Example I. 1.8 liters of whey was obtained. The ferrilactin was then precipitated with 0.053 molar ferric chloride brought up to a pH of 4.3, care being taken not to go above this pH. After ½-hour the precipitate of ferrilactin was removed by centrifuging and washed once with water. The precipitate of ferrilactin which was in the form of a sludge containing approximately 10% solids was then treated with $SO_2$ gas. When the pH of the liquid dropped to about 2 the precipitate dissolved and the treatment with $SO_2$ was continued for approximately 60 minutes. The container for the liquid was closed and the material was allowed to remain in contact with the $SO_2$ overnight.

In the morning, the pH of the solution was approximately 1.5 and some precipitate had come down. The pH was then adjusted to 2 with sodium hydroxide and a large precipitate appeared. This precipitate was removed by centrifuging and washed thoroughly with water which was previously adjusted to a pH of 4.3 so that precipitated material would not dissolve. In order to obtain complete yields the filtrate after removal of solid material was again treated with $SO_2$ and it was found that a small additional amount of solid material was precipitated.

The precipitate which we have called "lactin" was soluble at a pH of between 6 and 7 and did not coagulate at this pH when placed in boiling water. It was dried by precipitation with alcohol and ether and it was found that it still retained its solubility and resistance to heat coagulation from solution. The yield was approximately 0.64% of the whey which is approximately 25% greater than the yield obtained by the usual methods of precipitating lactalbumin. On analysis this material was found to contain only amino acid materials. A typical analysis calculated to 16 gm. of nitrogen was as follows:

| | |
|---|---|
| Aspartic acid | 13.0 |
| Glutamic acid | 14.2 |
| Serine | 5.6 |
| Glycine | 2.2 |
| Threonine | 5.1 |
| Alanine | 4.9 |
| Lysine | 9.7 |
| Arginine | 5.3 |
| Tyrosine | 5.7 |
| Phenylalanine | 4.0 |
| Valine | 6.7 |
| Cystine | 3.7 |

It is understood that these examples are given only by way of illustration.

What we claim is:

1. In making a chelated complex of ferric iron and whey proteins, the method which comprises separating the casein from whey, contacting a ferric salt with the whey proteins in the aqueous solution remaining after the casein separation, introducing into the solution also an acidic substance in amount if any required to establish a pH not above 4.5 after the contact with the ferric salt, then raising the pH by the addition of an alkali, and continuing the addition of alkali until a precipitate results, the precipitate being a chelate of ferric iron and whey proteins.

2. In making a whey protein, the method of claim 1 which includes contacting the resulting chelate of ferric iron and whey proteins with a reducing agent for ferric iron until the reducing agent converts the ferric to ferrous iron, this reduction of the iron liberating protein from the chelate and causing the iron to be separable as ferrous ion.

3. In making a whey protein, the method of claim 1 which includes contacting the resulting chelate of ferric iron and whey proteins with sulfur dioxide and maintaining the contact with the sulfur dioxide until ferric iron is reduced to ferrous and a precipitate appears that is insoluble at a pH of 2, the precipitate being a modified protein that in aqueous solution is non-heat-coagulable at 100° C. and a pH of 6–7.

(References on following page)

References Cited in the file of this patent

UNITED STATES PATENTS

| | | |
|---|---|---|
| 505,986 | Marfori et al. | Oct. 3, 1893 |
| 868,445 | Just | Oct. 15, 1907 |
| 1,036,405 | Zuckmayer | Aug. 20, 1912 |
| 2,103,153 | Dunham | Dec. 21, 1937 |
| 2,129,222 | Leviton | Sept. 6, 1938 |
| 2,401,919 | Ender | June 11, 1946 |

OTHER REFERENCES

Anson et al.: "Advances in Protein Chem.," vol. 5, pp. 210, 214–8 (1949).

Anson et al.: "Advances in Protein Chem.," vol. III, p. 54 (1947).

Anson: "Advances in Protein Chem.," vol. I, Academic Press Inc., N. Y. (1944), p. 149.

Greenberg: "Amino Acids and Proteins," Charles C. Thomas, Springfield, Ill., 1951, pp. 465–79.